(12) United States Patent
Kagaya et al.

(10) Patent No.: US 10,960,646 B2
(45) Date of Patent: Mar. 30, 2021

(54) WINDOW MEMBER AND VEHICLE WINDOW GLASS

(71) Applicant: AGC INC., Tokyo (JP)

(72) Inventors: Osamu Kagaya, Tokyo (JP); Masaru Shiina, Tokyo (JP); Kotaro Enomoto, Tokyo (JP); Kazuhiro Nakano, Tokyo (JP)

(73) Assignee: AGC INC., Tokyo (JP)

( * ) Notice: Subject to any disclaimer, the term of this patent is extended or adjusted under 35 U.S.C. 154(b) by 31 days.

(21) Appl. No.: 16/172,770

(22) Filed: Oct. 27, 2018

(65) Prior Publication Data

US 2019/0061481 A1 Feb. 28, 2019

Related U.S. Application Data

(63) Continuation of application No. PCT/JP2017/016864, filed on Apr. 27, 2017.

(30) Foreign Application Priority Data

Apr. 27, 2016 (JP) .............................. JP2016-089804
Apr. 27, 2016 (JP) .............................. JP2016-089806
Aug. 25, 2016 (JP) .............................. JP2016-165076

(51) Int. Cl.
   *B32B 3/24* (2006.01)
   *B32B 17/10* (2006.01)
   (Continued)

(52) U.S. Cl.
   CPC ........ *B32B 17/10293* (2013.01); *B32B 5/142* (2013.01); *B32B 7/12* (2013.01);
   (Continued)

(58) Field of Classification Search
   None
   See application file for complete search history.

(56) References Cited

U.S. PATENT DOCUMENTS 5,436,060 A * 7/1995 Saurer ............... B32B 17/10036
                                                             428/195.1
5,589,839 A * 12/1996 Lindenmeier ........ H01Q 1/1271
                                                             343/713
(Continued)

FOREIGN PATENT DOCUMENTS

DE    19616974 A1 * 10/1997 ........... B60Q 1/0023
DE    10010599 A1 *  9/2001 ....... B32B 17/10036
(Continued)

OTHER PUBLICATIONS

Machine Translation for DE 102008014089 A1, Sep. 2009 (Year: 2009).*

(Continued)

*Primary Examiner* — Jeffrey A Vonch
(74) *Attorney, Agent, or Firm* — Foley & Lardner LLP

(57) ABSTRACT

A window member includes a transparent substrate, wherein in plan view of the window member, the transparent substrate itself includes a first region, and a second region having higher radio-wave transmissivity than the first region. The transparent substrate may include a first glass sheet, and a second glass sheet which is laminated to the first glass sheet via an intermediate film.

23 Claims, 15 Drawing Sheets

(51) Int. Cl.
  *B32B 5/14* (2006.01)
  *B32B 7/12* (2006.01)
  *B60R 11/00* (2006.01)
  *B60J 1/00* (2006.01)
  *G01S 13/931* (2020.01)
  *B60R 11/02* (2006.01)
  *B60J 1/02* (2006.01)
  *B32B 3/26* (2006.01)

(52) U.S. Cl.
  CPC .. *B32B 17/10036* (2013.01); *B32B 17/10165* (2013.01); *B60J 1/00* (2013.01); *B60J 1/001* (2013.01); *B60J 1/008* (2013.01); *B32B 3/26* (2013.01); *B32B 3/266* (2013.01); *B32B 17/10045* (2013.01); *B32B 17/1055* (2013.01); *B32B 17/10201* (2013.01); *B32B 17/10761* (2013.01); *B32B 17/10788* (2013.01); *B32B 2307/20* (2013.01); *B32B 2307/412* (2013.01); *B32B 2419/00* (2013.01); *B32B 2605/006* (2013.01); *B60J 1/02* (2013.01); *B60R 11/02* (2013.01); *B60R 11/0205* (2013.01); *B60R 11/0264* (2013.01); *B60R 2011/0026* (2013.01); *G01S 2013/93276* (2020.01); *Y10T 428/24298* (2015.01); *Y10T 428/24331* (2015.01); *Y10T 428/24777* (2015.01)

(56) References Cited

U.S. PATENT DOCUMENTS

| | | | |
|---|---|---|---|
| 5,746,559 A | 5/1998 | Shirai | |
| 6,014,110 A * | 1/2000 | Bridges | H01Q 1/1271 343/783 |
| 6,395,398 B1 | 5/2002 | Nakashima et al. | |
| 10,562,274 B1 * | 2/2020 | Kingman | B60Q 1/0088 |
| 2002/0142149 A1 | 10/2002 | Nakashima et al. | |
| 2003/0010890 A1 * | 1/2003 | Sakata | B60R 11/04 250/203.2 |
| 2004/0208497 A1 | 10/2004 | Seger et al. | |
| 2006/0005482 A1 * | 1/2006 | Bennison | B32B 17/10293 52/204.5 |
| 2007/0041725 A1 * | 2/2007 | Neumann | B60S 1/0822 396/419 |
| 2007/0115357 A1 * | 5/2007 | Stein | H04N 7/181 348/148 |
| 2007/0190282 A1 * | 8/2007 | Erban | E06B 3/66342 428/49 |
| 2007/0216768 A1 * | 9/2007 | Smith | B60J 1/02 348/118 |
| 2008/0284850 A1 * | 11/2008 | Blaesing | H01Q 1/325 348/148 |
| 2009/0085755 A1 * | 4/2009 | Schafer | B60R 11/04 340/602 |
| 2009/0130395 A1 * | 5/2009 | Lyon | C03C 17/008 428/195.1 |
| 2009/0136702 A1 * | 5/2009 | Gu | B32B 17/10009 428/49 |
| 2010/0001897 A1 * | 1/2010 | Lyman | G01S 7/032 342/70 |
| 2010/0033647 A1 * | 2/2010 | Okita | H01L 27/14601 349/57 |
| 2011/0027515 A1 * | 2/2011 | Melcher | B32B 17/10761 428/63 |
| 2011/0091730 A1 * | 4/2011 | Hoppe | C03B 23/203 428/428 |
| 2011/0163904 A1 * | 7/2011 | Alland | B60R 1/00 342/1 |
| 2011/0309893 A1 * | 12/2011 | Kawamura | H01P 3/122 333/104 |
| 2012/0092499 A1 * | 4/2012 | Klar | G01S 13/867 348/148 |
| 2012/0119104 A1 * | 5/2012 | Arslan | B60R 11/04 250/395 |
| 2012/0276323 A1 * | 11/2012 | Mori | B32B 17/10174 428/77 |
| 2013/0094126 A1 * | 4/2013 | Rappoport | H01L 51/0097 361/679.01 |
| 2014/0118179 A1 | 5/2014 | Alland et al. | |
| 2014/0240998 A1 * | 8/2014 | Richard | B60Q 1/268 362/510 |
| 2014/0247473 A1 * | 9/2014 | Kuhnen | B60J 3/04 359/238 |
| 2014/0300738 A1 * | 10/2014 | Mueller | G03B 15/04 348/148 |
| 2014/0354462 A1 * | 12/2014 | Shi | H01Q 21/065 342/1 |
| 2015/0029336 A1 * | 1/2015 | Kucheryuk | H04N 5/2252 348/148 |
| 2015/0123838 A1 | 5/2015 | Shi | |
| 2015/0236491 A1 * | 8/2015 | Bureloux | B32B 17/10293 174/650 |
| 2016/0011309 A1 * | 1/2016 | Lynam | G01S 7/03 342/55 |
| 2016/0093944 A1 * | 3/2016 | Kamo | H01Q 1/1271 348/148 |
| 2016/0261034 A1 | 9/2016 | Geise | |
| 2017/0207513 A1 * | 7/2017 | Miyoshi | H01Q 1/38 |
| 2017/0207514 A1 * | 7/2017 | Kamo | B32B 27/285 |
| 2017/0274832 A1 * | 9/2017 | Abe | B60J 1/02 |
| 2017/0341491 A1 * | 11/2017 | Nakagawa | C03C 17/3681 |
| 2017/0369003 A1 * | 12/2017 | Williams | B60J 1/02 |
| 2018/0090876 A1 * | 3/2018 | Klein | H01R 13/6275 |
| 2018/0240284 A1 * | 8/2018 | Droste | B32B 17/10788 |
| 2019/0030865 A1 * | 1/2019 | Aoki | B60J 1/001 |
| 2019/0077704 A1 * | 3/2019 | Frebourg | B32B 17/10761 |
| 2019/0267704 A1 | 8/2019 | Geise | |

FOREIGN PATENT DOCUMENTS

| | | | |
|---|---|---|---|
| DE | 10333978 A1 * | 2/2005 | ....... B32B 17/10036 |
| DE | 10342837 A1 * | 4/2005 | ............ B60R 11/04 |
| DE | 10 2007 054 047 A | 8/2008 | |
| DE | 102007054047 A1 * | 8/2008 | ....... B32B 17/10036 |
| DE | 10 2007 042 028 A | 3/2009 | |
| DE | 102008014089 A1 * | 9/2009 | ............ B60R 11/04 |
| DE | 102014213502 A1 * | 1/2016 | ........... H01Q 1/3233 |
| EP | 0485333 A1 * | 5/1992 | ............... H01Q 1/42 |
| EP | 0723897 A1 * | 7/1996 | ......... B32B 17/10018 |
| EP | 0934851 A2 * | 8/1999 | ............. B60S 1/0822 |
| EP | 0888646 B1 * | 3/2000 | ............. H01Q 1/1271 |
| EP | 2390141 A1 * | 11/2011 | ............. B60R 1/001 |
| EP | 2902262 A1 * | 8/2015 | ............. B60R 11/04 |
| FR | 2681020 A1 * | 3/1993 | ........... H01Q 1/3283 |
| GB | 1427367 A * | 3/1976 | ............... B60J 1/02 |
| GB | 2205525 A * | 12/1988 | ....... B32B 17/10018 |
| GB | 2271139 A * | 4/1994 | ....... B32B 17/10293 |
| JP | 54107655 A * | 8/1978 | ............. H01Q 1/422 |
| JP | 58185339 A * | 10/1983 | ............. B60R 1/12 |
| JP | 01264301 A * | 10/1989 | ............... H01Q 1/42 |
| JP | H01-154486-UM A | 10/1989 | |
| JP | H09-014244 A | 1/1997 | |
| JP | H09-188133 A | 7/1997 | |
| JP | 2000-344548 A | 12/2000 | |
| JP | 2001-302290 A | 10/2001 | |
| JP | 2003133826 A * | 5/2003 | ............. B60R 1/12 |
| JP | 2005-512876 T | 5/2005 | |
| JP | 2006110808 A * | 4/2006 | ............. H01Q 1/42 |
| JP | 2006-298061 A | 11/2006 | |
| JP | 2006327381 A * | 12/2006 | ....... B32B 17/10036 |
| JP | 2007-039994 A | 2/2007 | |
| JP | 2010-070414 A | 4/2010 | |
| JP | 2010-158035 A | 7/2010 | |
| JP | 2011-502090 T | 1/2011 | |
| JP | 2014-051284 A | 3/2014 | |
| JP | 2016-071916 A | 5/2016 | |
| JP | 2016-175447 A | 10/2016 | |
| WO | WO-2008/127752 A2 | 10/2008 | |

(56) References Cited

FOREIGN PATENT DOCUMENTS

WO   WO-2014057267 A1 *  4/2014  ....... B32B 17/10174
WO   WO-2015/055371 A1    4/2015

OTHER PUBLICATIONS

Machine Translation of EP-0888646-B1, Mar. 2000 (Year: 2000).*
Machine Translation of JP-2006327381-A, Dec. 2006 (Year: 2006).*
Machine Translation of DE-102007054047-A1, Aug. 2008 (Year: 2008).*
Hasch et al., Millimeter-Wave Technology for Automotive Radar Sensors in the 77 GHz Frequency Band, Mar. 2012, IEEE Transactions on Microwave Theory and Techniques, vol. 60, No. 3, pp. 845-860 (Year: 2012).*
Machine Translation of JP-01264301-A, Oct. 1989 (Year: 1989).*
International Search Report (with English Translation) and Written Opinion (in Japanese ony) for PCT/JP2017/016864 dated Jun. 2, 2017.
Extended European Search Report dated Nov. 26, 2019 for corresponding Application No. 17789696.6.

* cited by examiner

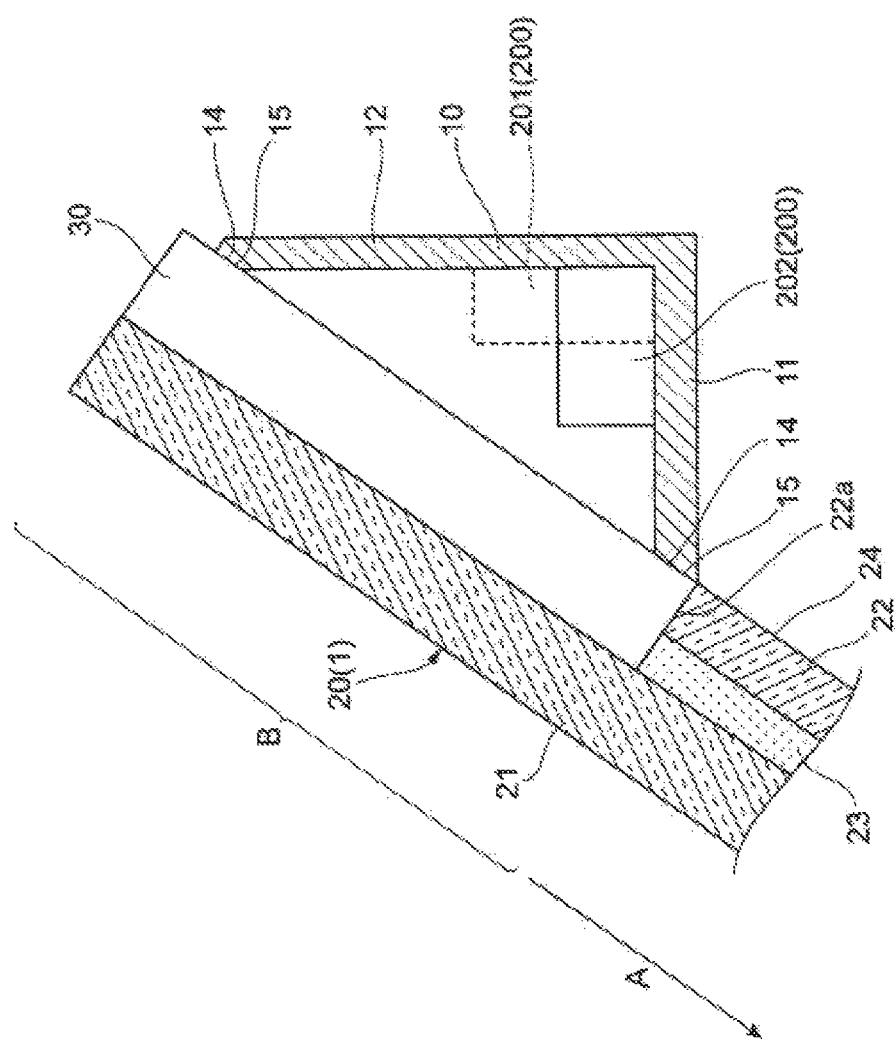

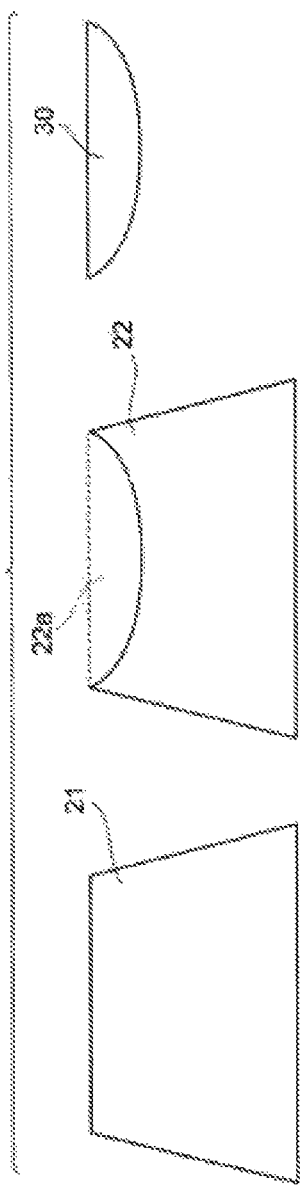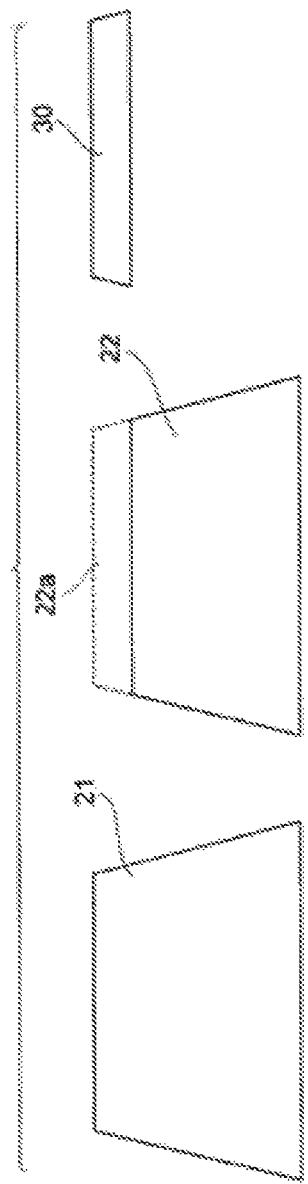

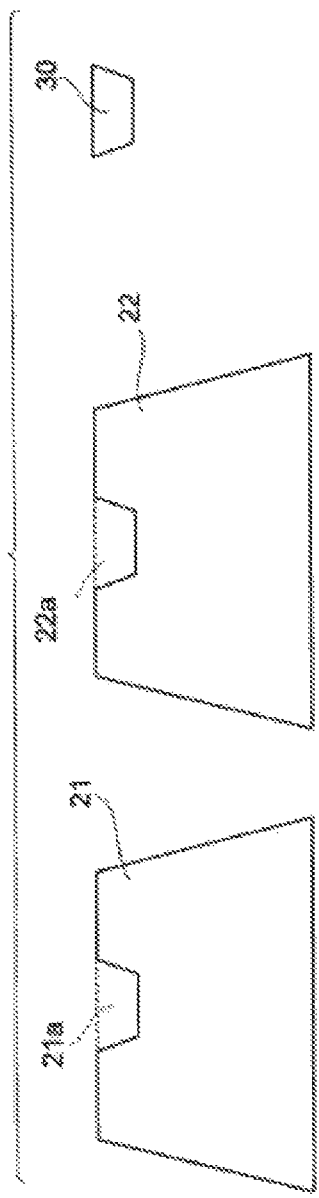
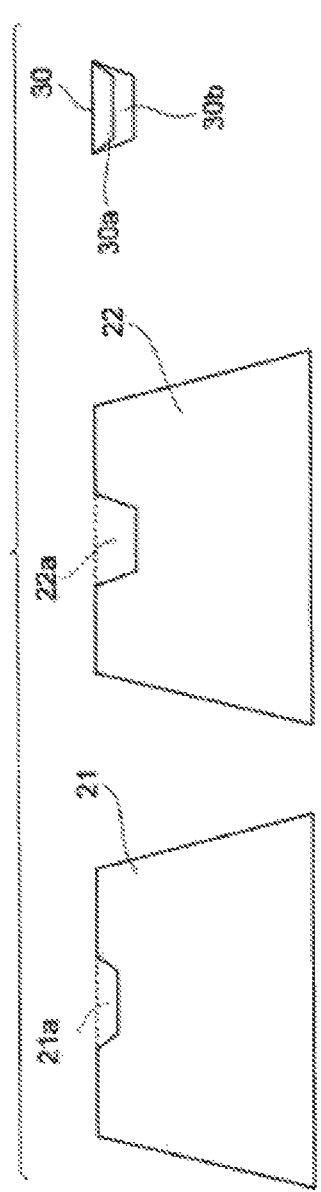

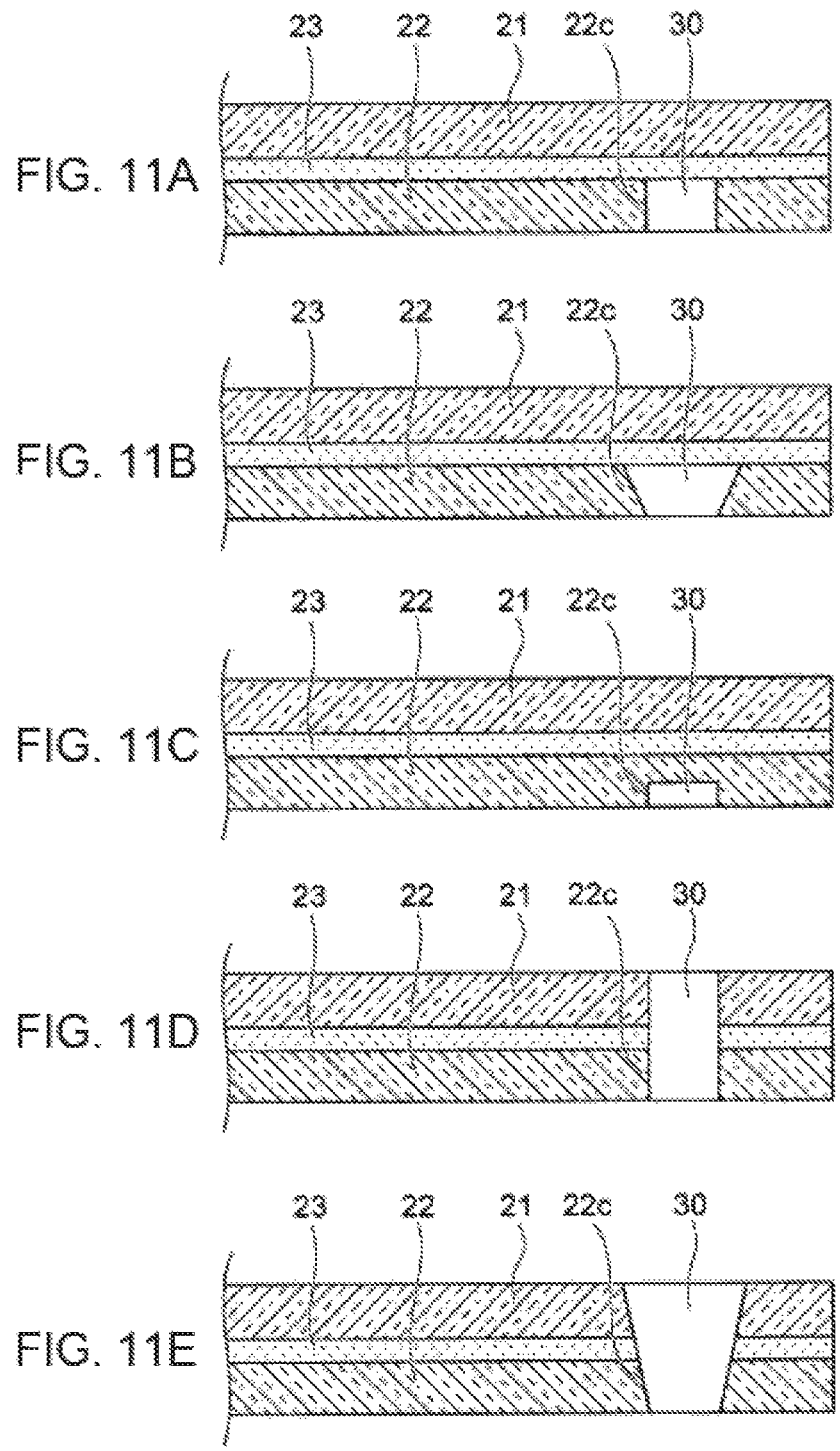

WINDOW MEMBER AND VEHICLE WINDOW GLASS

TECHNICAL FIELD

The present invention relates to a window member.

BACKGROUND ART

In recent years, researches about collision avoidance, driving assistance, automatic driving, etc. have been carried out using technology of detecting objects around a vehicle by a radar. A higher-level detection technique has been also developed using both detection of a radar and images of a camera. Here, in a typical car, a radar is provided in a front portion of a vehicle body (for example, in a front grille) or the like, and a stereo camera is provided near a front glass of the vehicle body or the like.

The radar which measures a distance between the car and a vehicle in front thereof may be disposed near the stereo camera, or may be disposed inside a vehicle cabin integrally with the stereo camera (for example, see Patent Literature 1). When a radar apparatus is provided inside a vehicle cabin, a radar wave is attenuated due to reflection and absorption of a glass sheet constituting a front glass. Particularly in a high frequency band (for example, a millimeter wave) such as a frequency band used in a radar, a radio wave having a short wavelength is used in order to enhance resolution. Thus, the influence of the glass sheet the radio wave passes through is increased.

In consideration of the aforementioned situation, Patent Literature 2 discloses a vehicular radar apparatus for suppressing deterioration of efficiency in transmitting and receiving radar radio waves. The radar apparatus uses a technique in which an incident angle on a glass is set suitably to improve efficiency in both reflection and transmission. Patent Literature 3 discloses a glass in which a surface of a transparent dielectric layer (excluding an aluminum nitride layer) coated onto a glass substrate which can be applied not only to a car but also to a building is coated with an Ag layer consisting of a continuous layer, and then subjected to heat treatment so that the Ag layer is deformed into a granular Ag layer.

CITATION LIST

Patent Literature

Patent Literature 1: JP-A-2014-051284
Patent Literature 2: JP-A-2016-071916
Patent Literature 3: JP-A-2000-344548

SUMMARY OF THE INVENTION

Problem that the Invention is to Solve

However, the efficiency with which the radio wave is transmitted through the glass sheet is not taken into consideration in the aforementioned background art. In addition, it has been studied to use a high frequency band in next-generation communications such as 5G or WiGig (Wireless Gigabit) (registered trademark). It is necessary to take the efficiency into consideration in the same manner.

The present invention provides a window member which improves radio-wave transmissivity of signals transmitted and received by an information device such as a radar or a communication apparatus.

Means for Solving the Problem

The window member according to the present invention is a window member including a transparent substrate, wherein in plan view of the window member, the transparent substrate itself includes a first region and a second region having higher radio-wave transmissivity than the first region.

In a window member according to an embodiment of the present invention, the transparent substrate includes a first glass sheet, and a second glass sheet which is laminated to the first glass sheet via an intermediate film.

In a window member according to an embodiment of the present invention, the second glass sheet includes a non-overlapped portion which is not overlapped with the first glass sheet, in at least a part of an edge portion of the second glass sheet, and the second region is defined in the non-overlapped portion.

In a window member according to an embodiment of the present invention, a radio-wave transmitting material having higher radio-wave transmissivity than the first region is disposed in the non-overlapped portion.

In a window member according to an embodiment of the present invention, the radio-wave transmitting material has a convex portion which protrudes in a thickness direction of the transparent substrate, and a concave portion which is fitted to the convex portion is formed in the first glass sheet.

In a window member according to an embodiment of the present invention, the first glass sheet has a non-overlapped portion in at least a part of an edge portion thereof, the non-overlapped portion being disposed to be continuous to the non-overlapped portion of the second glass sheet in a thickness direction.

In a window member according to an embodiment of the present invention, a radio-wave transmitting material having higher radio-wave transmissivity than the first region is disposed in the non-overlapped portions of the first glass sheet and the second glass sheet.

In a window member according to an embodiment of the present invention, a hole which penetrates at least a part of the second glass sheet in a thickness direction is formed in the second glass sheet, and the second region is defined in the hole.

In a window member according to an embodiment of the present invention, a radio-wave transmitting material having higher radio-wave transmissivity than the first region is disposed in the hole.

In a window member according to an embodiment of the present invention, a hole which penetrates the first glass sheet, the intermediate film and the second glass sheet is formed, and the second region is defined in the hole.

In a window member according to an embodiment of the present invention, a radio-wave transmitting material having higher radio-wave transmissivity than the first region is disposed in the hole.

In a window member according to an embodiment of the present invention, the first region is defined by a single glass sheet, and the second region is defined by a radio-wave transmitting material which is disposed adjacently to at least a part of an edge portion of the glass sheet and which has higher radio-wave transmissivity than the first region.

In a window member according to an embodiment of the present invention, the radio-wave transmitting material is at least one of resin, low-alkaline glass, non-alkaline glass, and silica glass.

For example, a vehicular window glass is provided using a window member according to the present invention. The frequency of a radio wave transmitted through the vehicular window glass is, for example, 76 GHz to 81 GHz.

Advantage of the Invention

A window member according to the present invention includes a first region and a second region having higher radio-wave transmissivity than the first region, in plan view. It is therefore possible to improve radio-wave transmissivity of signals transmitted and received by an information device.

BRIEF DESCRIPTION OF THE DRAWINGS

FIG. 3 is a side view of a site corresponding to FIG. 2.

FIG. 4A is a view illustrating the same example as a laminated glass illustrated in FIG. 2 and FIG. 3, and FIG. 4B is a view illustrating an example in which the second glass sheet has a non-overlapped portion provided along an edge portion thereof not to be overlapped with the first glass sheet, and a non-overlapped portion protruding in plan view.

FIG. 5A and FIG. 5B show states in which a specific example of the vehicular window glass has been exploded into a first glass sheet, a second glass sheet and a radio-wave transmitting material. FIG. 5A is a view illustrating an example in which a lower edge of a non-overlapped portion shows an arc shape, and FIG. 5B is a view illustrating an example in which a lower edge of a non-overlapped portion shows a straight shape.

FIG. 6A is a sectional view illustrating the same example as the laminated glass illustrated in FIG. 2 and FIG. 3, and FIG. 6B is a sectional view illustrating an example in which the radio-wave transmitting material has a convex portion protruding in the thickness direction of the vehicular window glass, and a concave portion to be fitted to the convex portion is formed in the first glass sheet.

FIG. 8A and FIG. 8B show states in which a specific example of the vehicular window glass has been exploded into a first glass sheet, a second glass sheet and a radio-wave transmitting material. FIG. 8A is a view illustrating an example in which a non-overlapped portion of the first glass sheet and a non-overlapped portion of the second glass sheet have one and the same shape in plan view, and FIG. 8B is a view illustrating an example in which a non-overlapped portion of the first glass sheet and a non-overlapped portion of the second glass sheet have different shapes in plan view.

FIG. 9A is an example corresponding to a section of the laminated glass illustrated in FIG. 8A, FIG. 9B is an example in which a bonding agent is further added to both surfaces in a bonding part, FIG. 9C is an example corresponding to a section of the laminated glass illustrated in FIG. 8B, and FIG. 9D is an example of FIG. 9A in which a thin glass sheet is further pasted onto a surface of the radio-wave transmitting material on the first glass sheet side.

FIG. 10A shows an example including a hole and a radio-wave transmitting material rectangular in plan view, FIG. 10B shows an example including a hole and a radio-wave transmitting material trapezoidal in plan view in the same manner as in FIG. 4A, FIG. 10C shows an example including a hole and a radio-wave transmitting material completely round in plan view, FIG. 10D shows an example including a hole and a radio-wave transmitting material trapezoidal in a vertically inverted manner as compared with FIG. 4A in plan view.

FIG. 11A to FIG. 11E show various shapes of the hole and the radio-wave transmitting material in sectional view in the vehicular window glass according to FIG. 4A and FIG. 4B. FIG. 11A shows an example in which the hole has a shape fixed in a sectional direction, FIG. 11B shows an example in which the hole has a shape gradually expanded (in a tapered manner) in the sectional direction from the second glass sheet toward the first glass sheet, FIG. 11C shows an example in which the hole is formed in only a part of the second glass sheet in the thickness direction thereof, FIG. 11D shows an example in which the hole is formed to penetrate the first glass sheet, an intermediate film and the second glass sheet, and the hole has a shape fixed in the sectional direction in the same manner as in FIG. 11A, and FIG. 11E shows an example in which the hole is formed to penetrate the first glass sheet, the intermediate film and the second glass sheet, and the through hole has a shape gradually expanded (in a tapered manner) in the sectional direction from the second glass sheet toward the first glass sheet in the same manner as in FIG. 11B.

FIG. 15A is an example in which a second region is formed in a region of an upper side of the building window glass, FIG. 15B is an example in which a second region is formed in a region of one side of the building window glass, and FIG. 15C is an example in which a second region is formed in a region of a corner portion of the building window glass.

MODE FOR CARRYING OUT THE INVENTION

Figure 1:
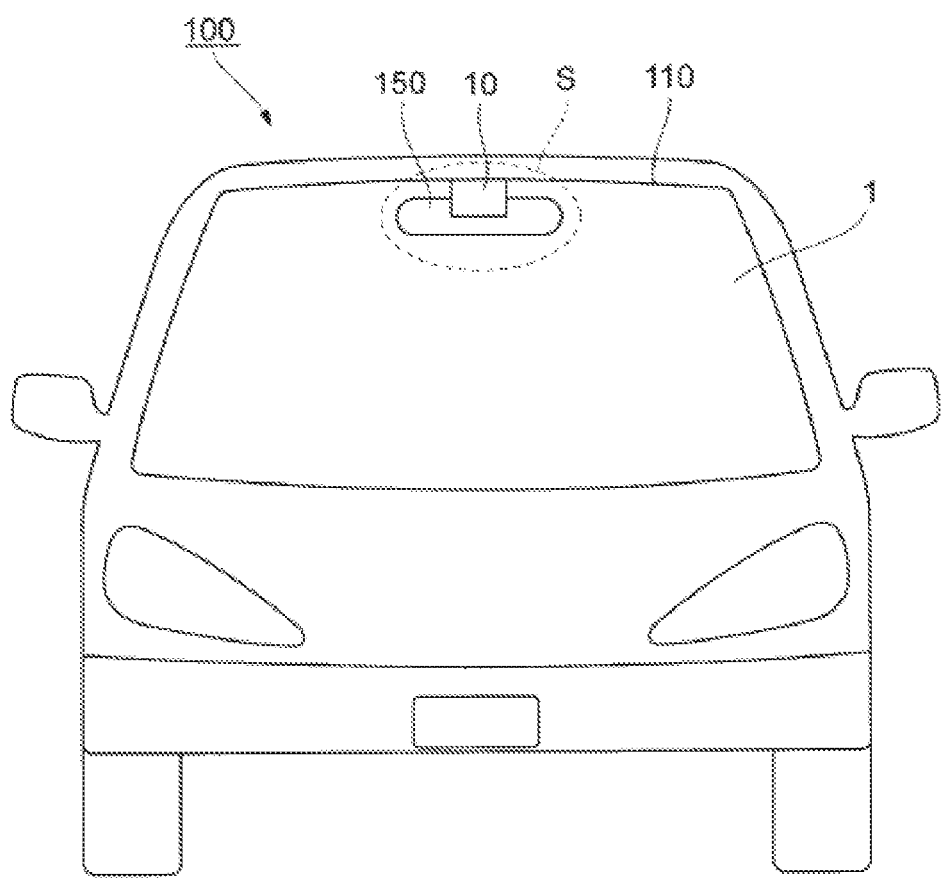
FIG. 1 is a conceptual view illustrating a state in which a vehicular window glass according to an embodiment of a window member has been attached to a vehicle.

A best mode for carrying out the present invention will be described below with reference to the drawings. FIG. 1 is a conceptual view illustrating a state in which a vehicular window glass according to an embodiment of a window member has been attached to a vehicle. In the embodiment, a vehicular window glass (window member) 1 serves as a front glass attached to an opening portion 110 formed in a front portion of a vehicle 100 such as a car.

In the vehicular window glass 1 according to the embodiment, a housing (case) 10 which stores an information device for securing traveling safety of the vehicle is attached to an interior-side surface of the vehicle. The information device is a device for preventing bumping or collision against a front vehicle, a pedestrian, an obstacle, etc. in front of the vehicle or informing a driver of such a risk using a camera, a radar, etc. The information device is, for example, an information receiving device and/or an information transmitting device, including a millimeter wave radar, a stereo camera, an infrared laser, etc., and performing reception and/or transmission of signals. The "signals" are electromagnetic waves which may include millimeter waves, visible light, infrared light, etc.

Figure 2:
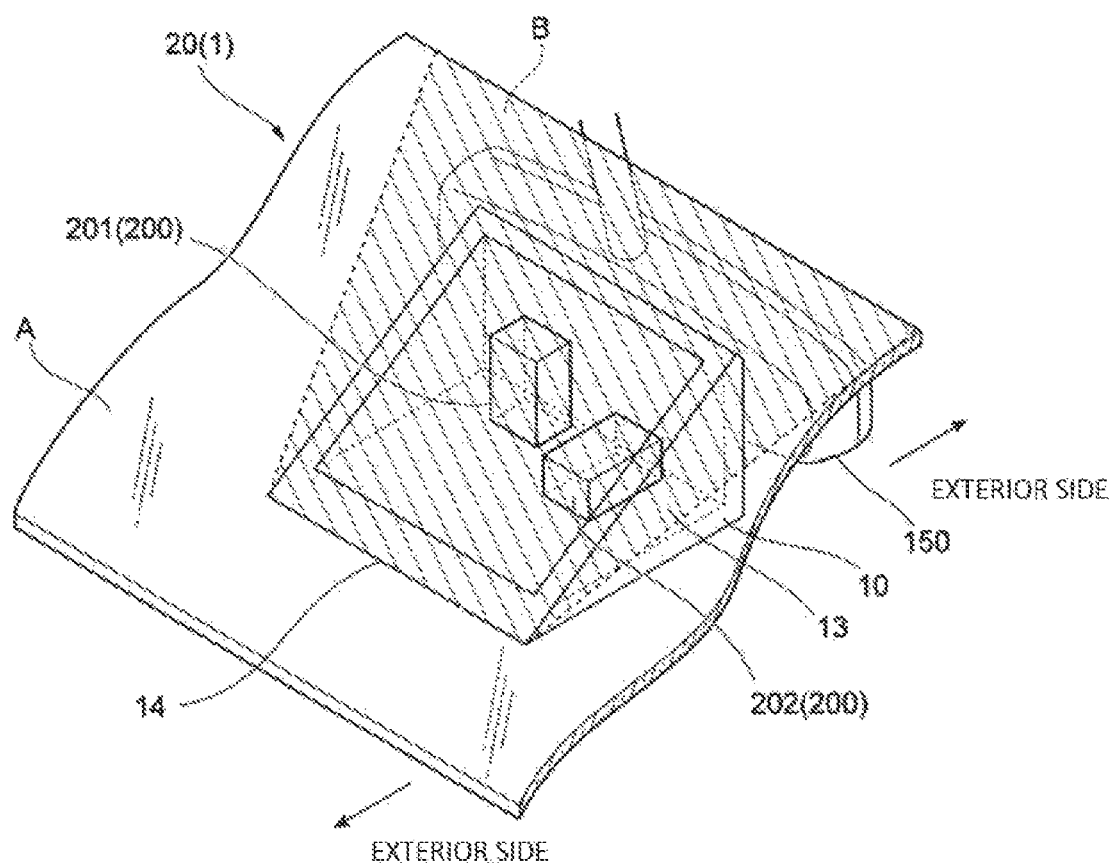
FIG. 2 is an enlarged view of a part S in FIG. 1, and is a perspective view illustrating a part in which a housing is attached to the vehicular window glass.

FIG. 2 is an enlarged view of a part S in FIG. 1, and is a perspective view illustrating a part in which the housing 10 has been attached to the vehicular window glass 1. The housing 10 is provided with a millimeter wave radar 201 and a stereo camera 202 serving as information devices 200. As will be described in details later, the vehicular window glass 1, particularly a laminated glass 20 serving as a transparent substrate that is a constituent member thereof, itself includes a first region A and a second region B in plan view. The second region B has higher radio-wave transmissivity than the first region A. The "plan view" means a projection view from the sheet thickness direction of the laminated sheet.

The housing 10 storing the information devices 200 is located to be closer to the exterior side of the vehicle than a back mirror 150 in view from the interior side of the vehicle and is attached to the vehicular window glass 1. As illustrated in FIG. 1, the back mirror 150 is attached to an indoor ceiling of the vehicle 100 in the embodiment. However, the back mirror 150 may be attached to the vehicular window glass 1 in the same manner as the housing 10.

FIG. 3 is a side view of a part corresponding to FIG. 2. The laminated glass (transparent substrate) 20 forming the vehicular window glass 1 has a first glass sheet 21, a second glass sheet 22, and an intermediate film 23 put between the first glass sheet 21 and the second glass sheet 22. That is, the second glass sheet 22 is laminated to the first glass sheet 21 via the intermediate film 23. The second glass sheet 22 has a first main surface 24 lied on the opposite side to the intermediate film 23.

A float process, a fusion process, etc. can be used as a method for manufacturing the laminated glass 20. However, the method is not limited particularly.

An example of the composition of the first glass sheet 21 and the second glass sheet 22 used in the embodiment may include, as represented by mol % based on oxides, a glass containing 50 to 80% of $SiO_2$, 0 to 10% of $B_2O_3$, 0.1 to 25% of $Al_2O_3$, 3 to 30% of $Li_2O+Na_2O+K_2O$, 0 to 25% of MgO, 0 to 25% of CaO, 0 to 5% of SrO, 0 to 5% of BaO, 0 to 5% of $ZrO_2$, and 0 to 5% of $SnO_2$. However, the composition is not limited particularly.

As the composition of the intermediate film 23, a composition which is generally used in a conventional vehicular laminated glass may be used. For example, polyvinylbutyral (PVB), ethylene vinyl acetal (EVA), etc. can be used. Alternatively, a thermosetting resin which is in a liquid state before heating may be used. That is, the intermediate film 23 may be layered in a state of the laminated glass 20, and the intermediate film 23 may be in a liquid state or the like before the first glass sheet 21 and the second glass sheet 22 are bonded.

The housing 10 has a substrate 11, an upstanding wall 12 substantially perpendicular to the substrate 11, and side walls 13 (see FIG. 2). The information devices 200 are fixed onto the substrate 11. An opening edge 14 which is formed by each edge of the substrate 11, the upstanding wall 12 and the side walls 13 is brought into contact with the first main surface 24 of the second glass sheet 22, and bonded to the first main surface 24 (exactly a surface of a radio-wave transmitting material 30 continuous from the first main surface 24 as will be described later) at a bonding portion 15. The housing 10 is formed out of a general resin, but the material of the housing 10 is not limited particularly.

In the embodiment, the information devices 200 are stored in a space defined by the substrate 11, the upstanding wall 12, and the side walls 13 of the housing 10 and the laminated glass 20. The storage of the information devices 200 may be achieved by an openable/closable portion provided in a part of the upstanding wall 12 and/or the substrate 11. The information devices 200 may be stored through a hollowed portion which is formed by hollowing a part of the upstanding wall 12 and/or the substrate 11. The upstanding wall 12 and/or the substrate 11 may be provided with claw portions (not shown in figures) for fixedly positioning the information devices 200 so that the stored information device 102 can be supported by the claw portions. Another device such as a rain sensor may be also disposed in the housing 10.

Particularly in the embodiment, the second glass sheet 22 has a non-overlapped portion 22a, which is not overlapped with the first glass sheet 21, in at least a part of an edge portion thereof. That is, in the embodiment, the area of the second glass sheet 22 is smaller than the area of the first glass sheet 21 by the area of a region corresponding to the non-overlapped portion 22a in plan view. A sheet-like radio-wave transmitting material which is, for example, made of resin is disposed in the non-overlapped portion 22a. As illustrated in FIG. 3, a second region B is defined in the non-overlapped portion 22a. In the embodiment, the intermediate film 23 is removed correspondingly to the non-overlapped portion 22a.

A material such as a resin forming the radio-wave transmitting material 30 has higher radio-wave transmissivity than a typical glass material forming the first glass sheet 21 and the second glass sheet 22. Therefore, the radio-wave transmissivity of the radio-wave transmitting material 30 is higher than that of the first region A. That is, the second region B where the second glass sheet 22 has been replaced by the radio-wave transmitting material 30 has higher radio-wave transmissivity than the first region A where the first glass sheet 21 and the second glass sheet 22 are present (radio-wave transmissivity of first region A<radio-wave transmissivity of second region B). The housing 10 is attached to a predetermined position of the vehicular window glass 1 so that at least a part of radio waves transmitted and received by the stored information devices 200 can be transmitted through the second region B. Although the first region A and the second region B are designated as different regions in plan view of the laminated glass 20 respectively, they should be grasped not as regions in a surface layer of the laminated glass but as regions forming a body of the laminated glass 20 respectively. That is, the first region A and the second region B are distributed in the laminated glass 20 itself as a transparent substrate, and defined including thicknesses in the regions respectively (see the undermentioned description of FIG. 12 for the concept of the thickness of each region). Each of the first region A and the second region B is not defined by only a part of the surface of the laminated glass 20.

The second region B has high radio-wave transmissivity so that loss of a radio wave (millimeter wave) can be suppressed particularly when the radio wave is transmitted or received by the millimeter wave radar 201. The radio-wave transmitting material 30 has less reflection and passing absorption of the radio wave, so that loss in both the reflection and the passing absorption can be suppressed.

Examples of resins which form the radio-wave transmitting material 30 may include ABS (acrylonitrile butadiene styrene), PVC (polyvinyl chloride), fluorine-based resin, polycarbonate, COP (cycloolefin polymer resin), SPS (syndiotactic polystyrene resin), modified PPE (modified polyphenylene ether), etc. However, the radio-wave transmitting material 30 is not limited particularly. The radio-wave transmitting material may be made of another material than so-called resin, such as carbon fiber, though not limited. Particularly as the radio-wave transmitting material 30, a material having a low dielectric constant, a low tan δ (dielectric tangent; δ designates a loss angle), and particularly a less dielectric loss is preferably used. From this viewpoint, for example, low-alkaline glass, non-alkaline glass, silica glass, etc. can be used as a raw material forming the radio-wave transmitting material 30 due to their less dielectric loss than a general glass.

Figure 4A:
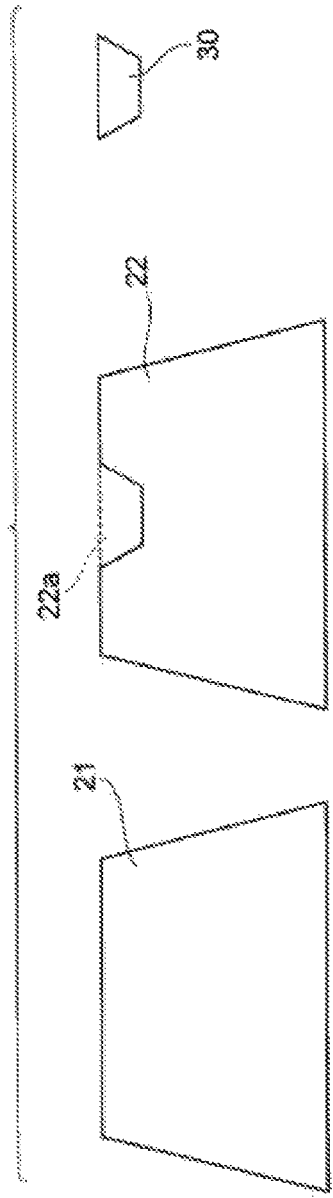
FIG. 4A and FIG. 4B show states in which a specific example of the vehicular window glass has been exploded into a first glass sheet, a second glass sheet and a radio-wave transmitting material.
Figure 4B:
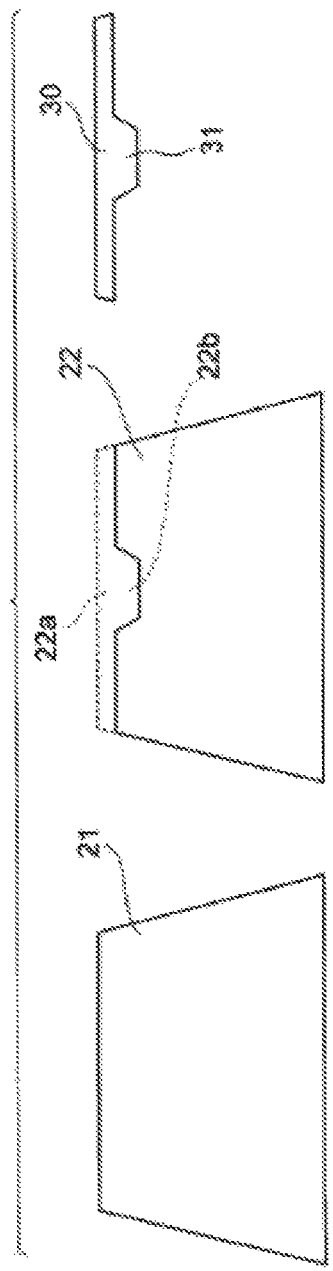

FIG. 4A and FIG. 4B show states in which a specific example of the laminated glass 20 as the vehicular window glass 1 has been exploded into the first glass sheet 21, the second glass sheet 22 and the radio-wave transmitting material 30, particularly illustrating various shapes in plan view of the non-overlapped portion 22a and the radio-wave transmitting material 30. FIG. 4A illustrates the same example as the laminated glass 20 illustrated in FIG. 2 and FIG. 3, in which the second glass sheet 22 has a non-overlapped portion 22a in a part of an edge portion thereof not to be overlapped with the first glass sheet 21. FIG. 4B illustrates another example of the laminated glass 20, in which the second glass sheet 22 has a non-overlapped portion 22a provided along an edge portion thereof not to be overlapped with the first glass sheet 21, and further a non-overlapped portion 22b protruding in plan view.

FIG. 5A illustrates another example of the laminated glass 20, in which the second glass sheet 22 has a non-overlapped portion 22a provided along an edge portion thereof not to be overlapped with the first glass sheet 21, and a lower edge of the non-overlapped portion 22a shows an arc shape. FIG. 5B illustrates another example of the laminated glass 20, in which the second glass sheet 22 has a non-overlapped portion 22a provided along an edge portion thereof not to be overlapped with the first glass sheet 21, and a lower edge of the non-overlapped portion 22a shows a straight shape.

Figure 6A:
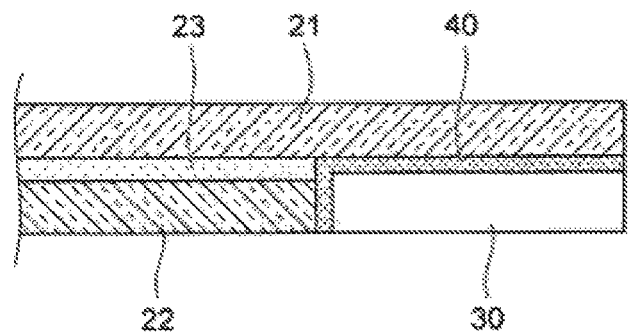
FIG. 6A and FIG. 6B show various shapes of the non-overlapped portion and the radio-wave transmitting material in sectional view.
Figure 6B:
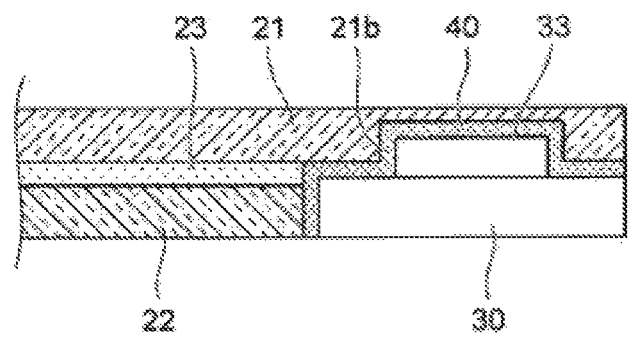

FIG. 6A and FIG. 6B show various shapes particularly of the non-overlapped portion 22a and the radio-wave transmitting material 30 in sectional view as to specific examples of the laminated glass 20 as the vehicular window glass 1. FIG. 6A illustrates the same example as the laminated glass 20 illustrated in FIG. 2 and FIG. 3. The figure shows a bonding agent layer 40 for bonding the radio-wave transmitting material 30 to the first glass sheet 21 and the second glass sheet 22. Polyimide or the like may be used as the bonding agent of the bonding agent layer 40, though not limited particularly. The bonding agent layer 40 is not essential. The bonding agent layer 40 is not necessary when the radio-wave transmitting material 30 itself has a property adhering to the first glass sheet 21 and the second glass sheet 22.

FIG. 6B illustrates another example of the laminated glass 20, in which the radio-wave transmitting material 30 has a convex portion 33 protruding in the thickness direction of the laminated glass 20 as the vehicular window glass 1, and a concave portion 21b to be fitted to the convex portion 33 is formed in the first glass sheet 21. The bonding strength is improved by engagement between the convex portion 33 and the concave portion 21b.

Figure 7:
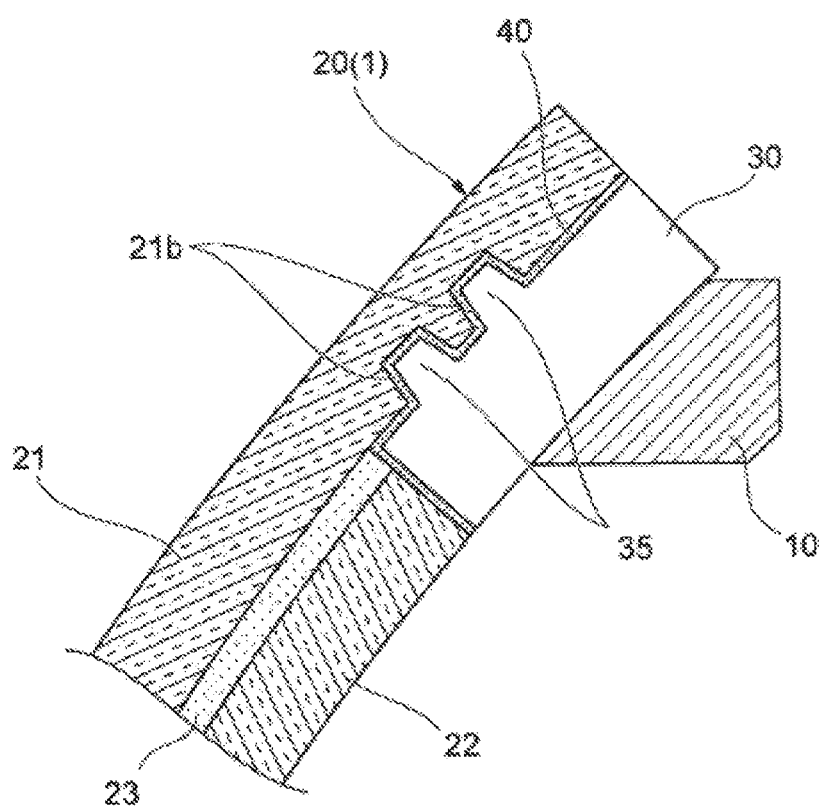
FIG. 7 is a sectional view illustrating an example similar to the example of FIG. 6B, in which the radio-wave transmitting material has a plurality of rows of convex portions, and a plurality of rows of concave portions to be fitted to the convex portions are formed in the first glass sheet.

FIG. 7 illustrates an example similar to the laminated glass 20 of FIG. 6B, in which the radio-wave transmitting material 30 has a plurality of rows of convex portions protruding in the thickness direction of the laminated glass 20 as the vehicular window glass 1, and a plurality of rows of concave portions 21b to be fitted to the convex portions are formed in the first glass sheet 21. The bonding strength is further improved by engagement between the rows of convex portions 35 and the rows of concave portions 21b. Two rows of convex portions 35 and two rows of concave portions 21b are illustrated in FIG. 7. However, the number of rows of convex portions 35 and the number of rows of concave portions 21b are not limited particularly.

FIG. 8A and FIG. 8B show states in which a specific example according to another embodiment of the laminated glass 20 as the vehicular window glass 1 has been exploded into a first glass sheet 21, a second glass sheet 22 and a radio-wave transmitting material 30. Particularly FIG. 8A and FIG. 8B show various shapes in plan view of a non-overlapped portion 21a of the first glass sheet 21, a non-overlapped portion 22a of the second glass sheet 22, and the radio-wave transmitting material 30. That is, in this example, not only the second glass sheet 22 but also the first glass plate 21 has the non-overlapped portion 21a in at least a part of the edge portion so that the non-overlapped portion 21a is disposed to be continuous to the non-overlapped portion 22a of the second glass sheet 22 in the thickness direction. That is, the non-overlapped portion 21a of the first glass sheet 21 and the non-overlapped portion 22a of the second glass sheet 22 are overlapped with each other entirely or partially to integrally define a region having high radio-wave transmissivity. Further, the radio-wave transmitting material 30 is disposed in both the non-overlapped portions 21a and 22a.

In the example of FIG. 8A, the non-overlapped portion 21a of the first glass sheet 21 and the non-overlapped portion 22a of the second glass sheet 22 have one and the same shape in plan view, and they are overlapped with each other all over their regions. FIG. 8B illustrates another example of the laminated glass 20, in which the non-overlapped portion 21a of the first glass sheet 21 and the non-overlapped portion 22a of the second glass sheet 22 do not have the same shape in plan view, the non-overlapped portion 21a is smaller than the non-overlapped portion 22a in plan view, and the whole of the non-overlapped portion 21a is overlapped with a part of the non-overlapped portion 22a. The radio-wave transmitting material 30 has a first radio-wave transmitting portion 30a whose shape corresponds to the shape of the non-overlapped portion 21a, and a second radio-wave transmitting portion 30b whose shape corresponds to the shape of the non-overlapped portion 22a. In this embodiment, the radio-wave transmitting material 30 is disposed in both the first glass sheet 21 and the second glass sheet 22, so that the radio-wave transmissivity of the second region B is further improved.

Figure 9A:
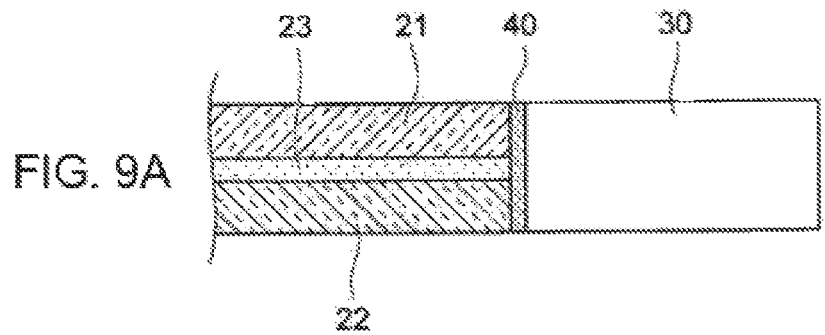
FIG. 9A to FIG. 9D show various shapes of the non-overlapped portion and the radio-wave transmitting material in sectional view according to specific examples of the vehicular window glass.
Figure 9B:
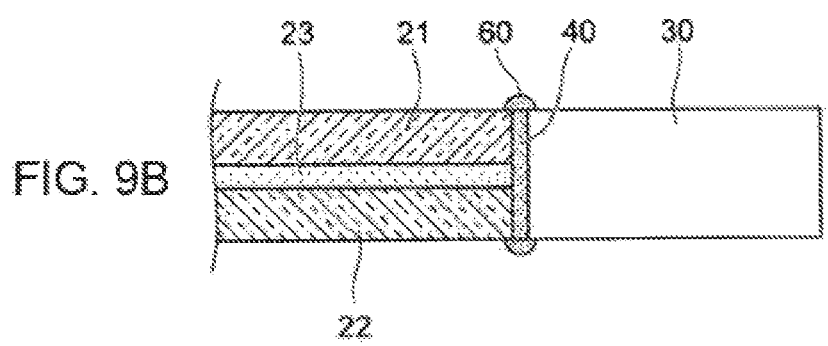
Figure 9C:
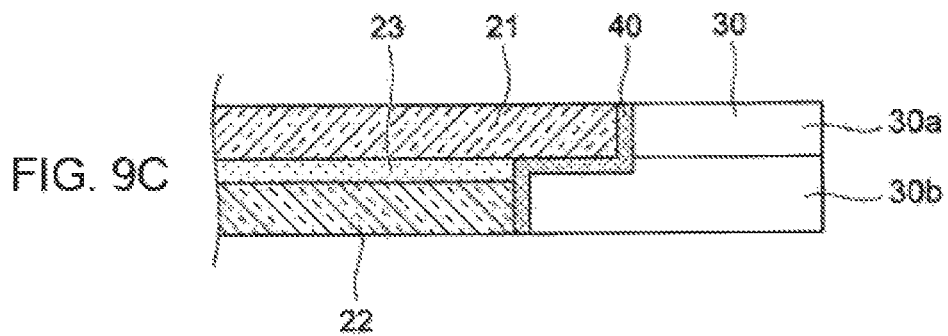
Figure 9D:
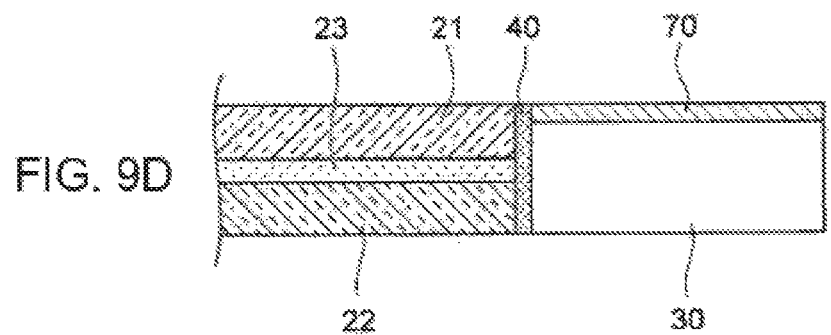

FIG. 9A to FIG. 9D show various shapes particularly of the non-overlapped portion 22a and the radio-wave transmitting material 30 in sectional view according to specific examples of the laminated glass 20 as the vehicular window glass 1. FIG. 9A corresponds to a section of the laminated glass 20 illustrated in FIG. 8A. FIG. 9B shows the example of FIG. 9A in which a bonding agent 60 is further added to both surfaces in a bonding part so as to improve the bonding strength. FIG. 9C corresponds to a section of the laminated glass 20 illustrated in FIG. 8B. FIG. 9D shows the example of FIG. 9A in which a thin glass sheet 70 is further pasted onto a surface of the radio-wave transmitting material 30 on the first glass sheet 21 side.

FIG. 10A to FIG. 10D show specific examples of a second glass sheet 22 in a laminated glass 20 according to another embodiment. According to this embodiment, a hole 22c penetrating at least a part of the second glass sheet 22 in the thickness direction is formed in the second glass sheet 22. That is, the hole 22c is formed inside the second glass sheet 22 in plan view. The second region B is defined in the hole 22c. In the example, the radio-wave transmitting material 30 is disposed in the hole 22c.

Figure 10A:
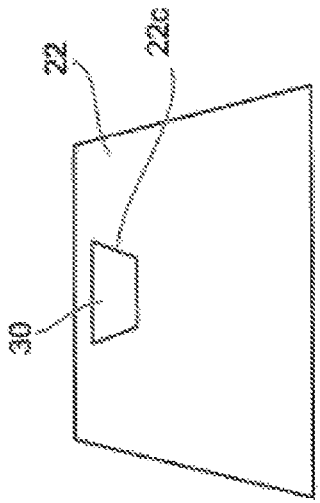
FIG. 10A to FIG. 10D show specific examples of a second glass sheet in a laminated glass 20 according to another embodiment.
Figure 10B:
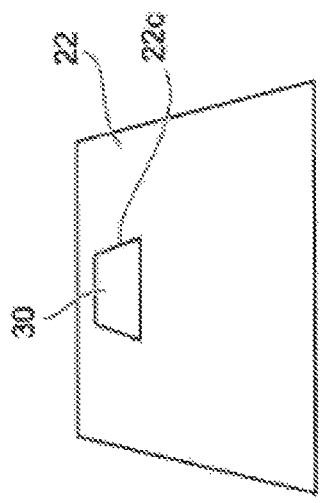
Figure 10C:
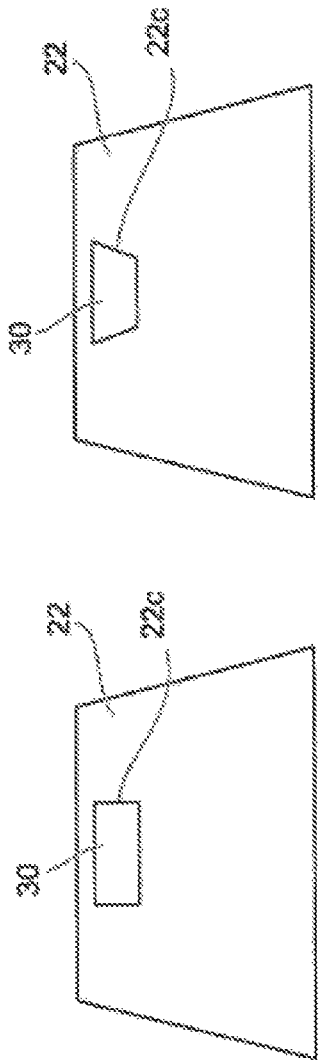
Figure 10D:
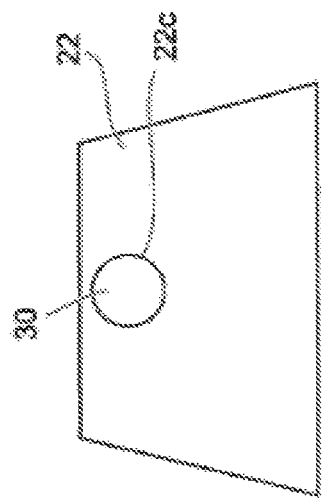

FIG. 10A illustrates an example of the hole 22c rectangular in plan view and the radio-wave transmitting material 30. FIG. 10B illustrates an example of the hole 22c and the radio-wave transmitting material 30 trapezoidal in plan view in the same manner as in FIG. 4A. FIG. 10C illustrates an example of the hole 22c and the radio-wave transmitting material 30 completely round in plan view. FIG. 10D illustrates an example of the hole 22c and the radio-wave transmitting material 30 trapezoidal in plan view in a vertically inverted manner as compared with FIG. 4A. In FIG. 10C, the hole 22c is not limited to the completely round shape, but may have an elliptic shape, an oval shape (an egg-like shape, a rounded rectangular shape, etc.), or the like.

FIG. 11A to FIG. 11E show various shapes particularly of the hole 22c and the radio-wave transmitting material 30 in sectional view according to specific examples of the laminated glass 20 as the vehicular window glass 1. FIG. 11A illustrates an example in which the hole 22c has a shape fixed in the sectional direction. FIG. 11B illustrates an example in which the hole 22c has a shape gradually expanded (in a tapered manner) in the sectional direction from the second glass sheet 22 toward the first glass sheet 21.

In each of the examples of FIG. 10A to FIG. 10D, FIG. 11A and FIG. 11B, the hole 22c is formed throughout in the thickness direction of the second glass sheet 22. That is, the hole 22c is a through hole penetrating the second glass sheet 22. On the other hand, FIG. 11C illustrates an example in which the hole 22c is formed in only a part of the second glass sheet 22 in the thickness direction thereof without penetrating the second glass sheet 22 throughout. Here, the hole 22c shows a hollowed shape which is formed in the surface of the second glass sheet 22. In this manner, even when the hole 22c is formed in only a part of the second glass sheet 22 in the thickness direction and the radio-wave transmitting material 30 is formed in only a part of the second glass sheet 22 in the thickness direction, the radio-wave transmissivity is improved in comparison with that of the first region A.

In each of the examples of FIG. 11D and FIG. 11E, the hole 22c is formed to penetrate the first glass sheet 21, the intermediate film 23 and the second glass sheet 22. That is, the hole 22c is a through hole penetrating the laminated glass 20 as the vehicular window glass 1. In the hole 22c, the second region B is defined. Further, the radio-wave transmitting material 30 is disposed in the hole 22c. In these examples, the laminated glass 20 as the vehicular window glass 1 has a shape in plan view as illustrated in FIG. 10A to FIG. 10D. FIG. 11D illustrates an example in which the hole 22c has a shape fixed in the sectional direction in the same manner as in FIG. 11A. FIG. 11E illustrates an example in which the hole 22c has a shape gradually expanded (in a tapered manner) in the sectional direction from the second glass sheet 22 toward the first glass sheet 21 in the same manner as in FIG. 11B.

Although the radio-wave transmitting material 30 is disposed in the hole 22c in each of the examples of FIG. 10A to FIG. 11E, it is not essential to dispose the radio-wave transmitting material 30. When the radio-wave transmitting material 30 is not disposed in the hole 22c, the hole 22c is occupied by the air in a normal specification. However, the radio-wave transmissivity of the air is higher than the radio-wave transmissivity of glass. Therefore, also in this case, the second region B is defined. In other words, the air plays a role equivalent to the radio-wave transmitting material 30.

Figure 12:
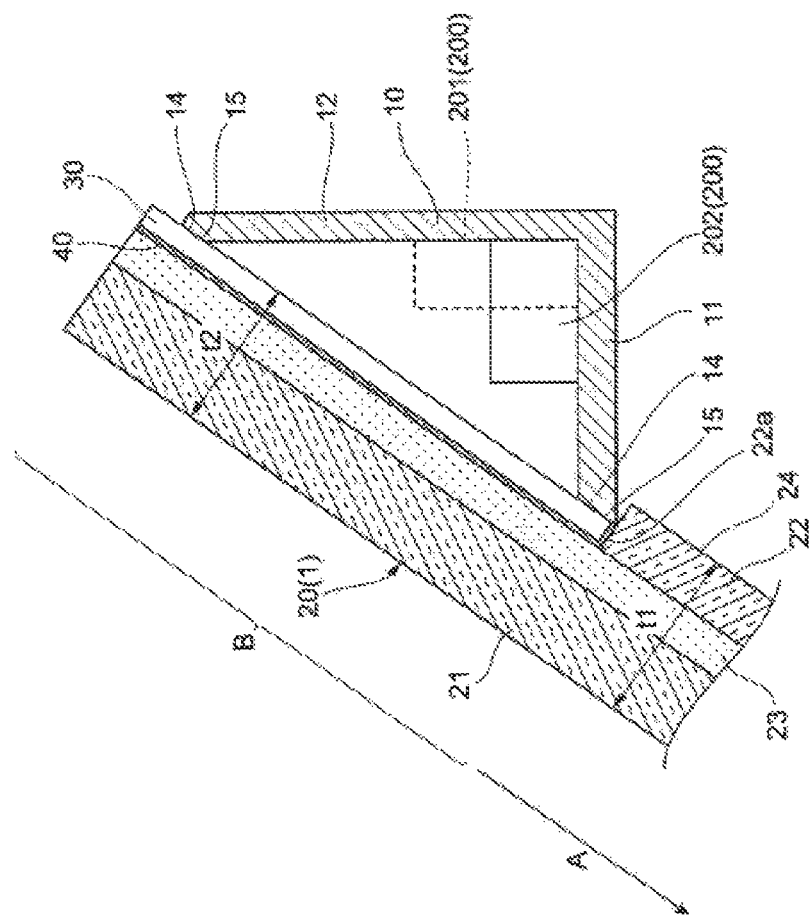
FIG. 12 is a side view of a modified example of the embodiment of FIG. 3.

FIG. 12 shows a modified example of the embodiment of FIG. 3. In this example, differently from FIG. 3, the intermediate film 23 is also formed in the second region B, and the radio-wave transmitting material 30 is bonded to the intermediate film 23 and the second glass sheet 22 via a bonding agent layer 40. The thickness of the radio-wave transmitting material 30 is reduced so that thickness $t_2$ of the second region B is smaller than thickness $t_1$ of the first region A. When the thickness of the second region B is reduced as in this example, the radio-wave transmissivity can be improved. As a method for reducing the thickness $t_2$ of the second region B, the thickness of the first glass 21 may be reduced, or the intermediate film 23 may be omitted to allow the radio-wave transmitting material 30 to adhere directly to the first glass sheet 21. Alternatively, by use of a resonance phenomenon or the like, the thickness of the second region B may be increased to improve the radio-wave transmissivity. That is, it may be considered that the first region A and the second region B are made to differ in thickness from each other.

A method for attaching the housing 10 to the vehicular window glass 1 is not limited particularly. Although the housing 10 is attached to the vehicular window glass 1 at the bonding portion 15 in each embodiment, the claws or the like, for example, may be provided in the housing 10 so as to be hooked in concave portions formed in the vehicular window glass 1. Alternatively, the housing 10 may be attached not to the vehicular window glass 1 but to another site inside the vehicle 100.

Figure 13A:
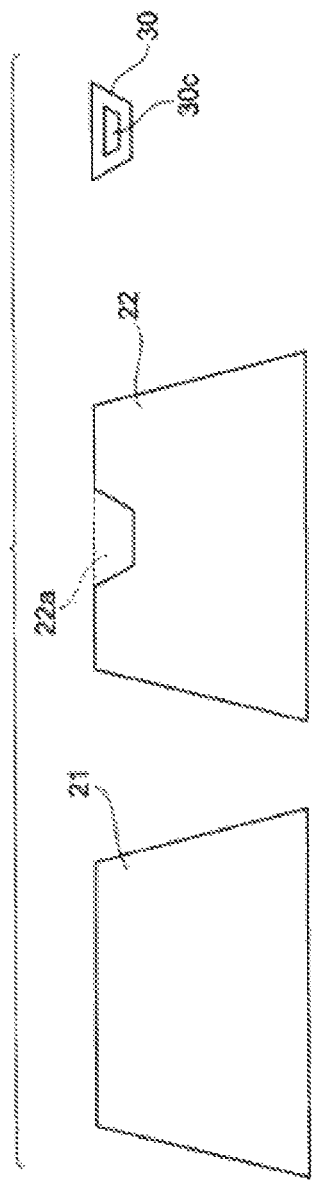
FIG. 13A and FIG. 13B are views illustrating modified examples of the embodiments of FIG. 4A and FIG. 4B.
Figure 13B:
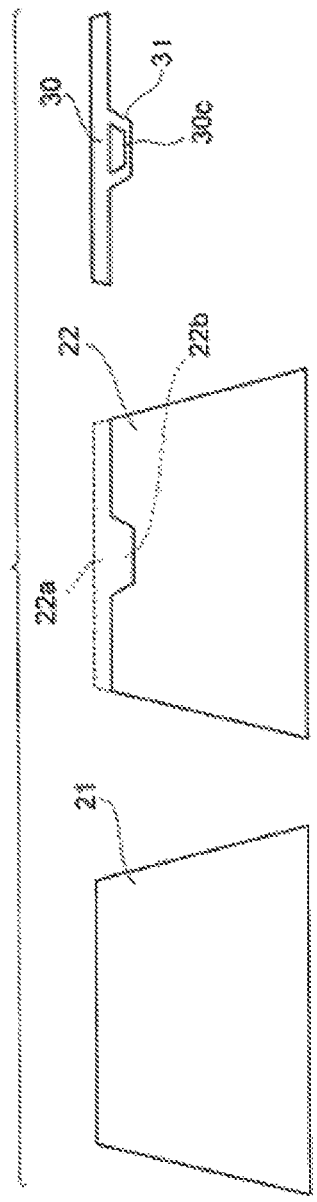

FIG. 13A and FIG. 13B illustrate modified examples of the embodiments of FIG. 4A and FIG. 4B. In each example, a through hole 30c is provided in the radio-wave transmitting material 30 so as to improve the radio-wave transmissivity and reduce the weight. Also in each embodiment of FIG. 5A to FIG. 12, a through hole 30c may be provided in the radio-wave transmitting material 30 in the same manner.

Figure 14:
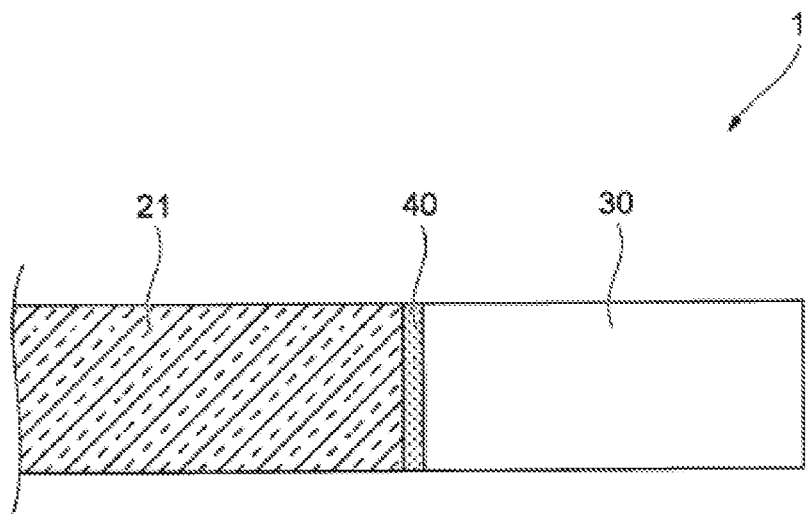
FIG. 14 is a sectional view of an example in which a radio-wave transmitting material is bonded to an edge portion of a single glass sheet.

In the embodiments which have been described, it is assumed that the laminated glass 20 is used as the vehicle window glass 1, and the first glass sheet 21, the intermediate film 23 and the second glass sheet 22 are present. However, the concept of the present invention can be also applied to a single glass. FIG. 14 illustrates such an example. In FIG. 14, the single glass sheet is composed only of the first glass sheet 21, and the first region A is defined by the single glass sheet (first glass sheet 21). Then the second region B is defined by the radio-wave transmitting material 30 which is disposed adjacently to at least a part of an edge portion of the first glass sheet 21 and which has higher radio-wave transmissivity than the first region A (that is, the first glass sheet 21). In this example, the first glass sheet 21 and the radio-wave transmitting material 30 are bonded with a bonding agent layer 40 so that a transparent substrate including the first region and the second region in itself is formed by the first glass sheet 21 and the radio-wave transmitting material 30. The vehicular window glass 1 formed thus can be used as a rear glass which is, for example, attached to an opening portion formed at the rear of the vehicle. As illustrated in FIG. 10A to FIG. 11E, a hole penetrating at least a part of the single first glass sheet 21 in the thickness direction thereof may be formed in the first glass sheet 21 so as to define the second region B. The radio-wave transmitting material 30 may be provided in this hole.

The frequency of a radio wave which is transmitted through the vehicular window glass 1 is not limited particularly. The frequency band used by the millimeter wave radar 201 described in the embodiments is, for example, 76 GHz to 81 GHz. The vehicular window glass 1 according to the present invention has capacity with which a radio wave of such a frequency can be transmitted efficiently.

In the vehicular window glass 1 according to the embodiments, the second region B is formed near the upper edge of the opening portion 110 of the vehicle 100. However, the second region B may be formed at any position in plan view of the vehicular window glass 1. The position where the second region B is formed can be set in accordance with the positions where the information devices 200 such as the millimeter wave radar 201 are disposed.

Figure 15A:
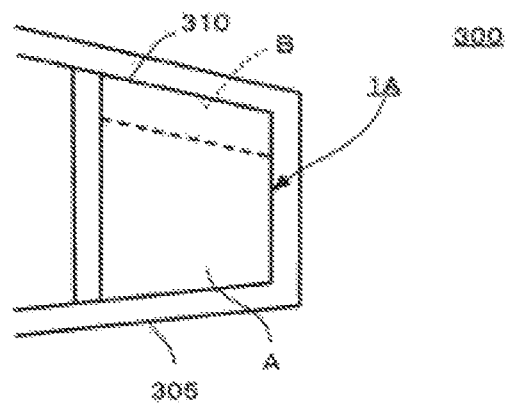
FIG. 15A to FIG. 15C show conceptual views illustrating states in which a building window glass according to another embodiment of a window member has been attached to a building.
Figure 15B:
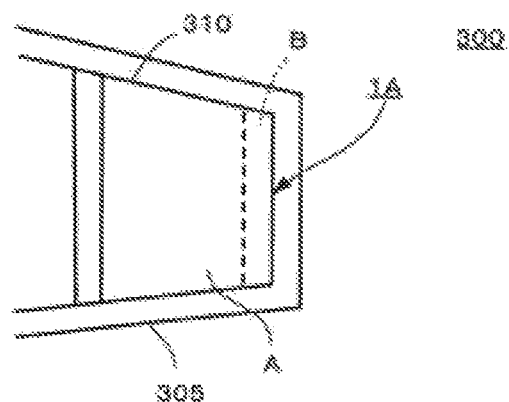
Figure 15C:
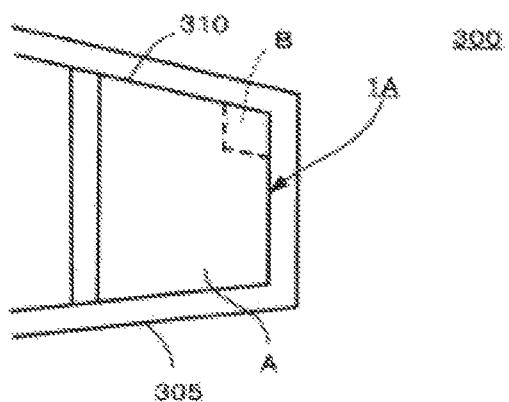

The aforementioned embodiments show examples in which a window member is applied to a vehicular window glass. However, the window member according to the present invention can be applied not only to the vehicular window glass but also to a building window glass to be used in a building. FIG. 15A to FIG. 15C are conceptual views illustrating states in which a building window glass according to another embodiment of a window member has been attached to a building. In this embodiment, a building window glass (window member) 1A is formed in a wall surface of a building 300, so as to serve as a window glass attached to an opening portion 310 surrounded by a frame 305.

In the same manner as the vehicular window glass 1, the building window glass 1A has a first region A and a second region B, and the relation of (radio-wave transmissivity of first region A<radio-wave transmissivity of second region B) is established. Each region can be implemented by a similar configuration to that of the vehicular window glass 1. FIG. 15A illustrates an example in which the second region B is formed in a region of an upper side of the building window glass 1A. FIG. 15B illustrates an example in which the second region B is formed in a region of one side of the building window glass 1A. FIG. 15C illustrates an example in which the second region B is formed in a region of a corner portion of the building window glass 1A.

It has been studied to use a high frequency band in next-generation communications such as 5G or WiGig (registered trademark). When transmission and reception of wireless communication in such a high frequency band are carried out inside the building 300, it is estimated that the influence of a glass sheet may be increased. However, when the whole surface of the glass sheet is formed out of a material with high radio-wave transmissivity, various problems are likely to occur in terms of influence of radio waves on human bodies, and so on. Therefore, as in the embodiment, setting the transmissivity high only in a region of a part of the building window glass 1A (the transmissivity in the second region B) makes it possible to cope with a variation of a communication band in future wireless communication while solving potential problems.

The present invention is not limited to the aforementioned embodiments, but deformations, improvements, etc. can be made suitably. In addition, materials, shapes, dimensions, values, forms, numbers, arrangement places, etc. of respective constituent elements in the aforementioned embodiments are not limited. Any materials, any shapes, any dimensions, any values, any forms, any numbers, any arrangement places, etc. may be used as long as the invention can be attained.

The present application is based on Japanese Patent Application No. 2016-089804 and 2016-089806 filed on Apr. 27, 2016, and Japanese Patent Application No. 2016-165076 filed on Aug. 25, 2016, the contents of which are incorporated herein by reference.

INDUSTRIAL APPLICABILITY

A vehicular window glass according to the present invention can improve radio-wave transmissivity of signals to be transmitted and received by an information device such as a millimeter wave radar. The vehicular window glass according to the present invention can be used suitably as a vehicular window glass contributing to improvement in travelling performance of a vehicle such as safety.

DESCRIPTION OF REFERENCE NUMERALS AND SIGNS 1 vehicular window glass (window member)
1A building window glass (window member)
10 housing
11 substrate
12 upstanding wall
13 side wall
14 opening edge
15 bonding portion
20 laminated glass (transparent substrate)
21 first glass sheet
22 second glass sheet
22a non-overlapped portion
22c hole
23 intermediate film
24 first main surface
30 radio-wave transmitting material
100 vehicle
201 millimeter wave radar
202 stereo camera
A first region
B second region

The invention claimed is:
1. A window member comprising:
a transparent substrate,
wherein, in a plan view of the window member, the transparent substrate comprises a first region and a second region having a higher radio-wave transmissivity than the first region,
wherein the transparent substrate comprises
a first glass sheet extending throughout the first region and the second region,
a second glass sheet extending throughout the first region but does not extend within the second region such that the second glass sheet does not overlap the first glass sheet in the second region,
an intermediate film extending throughout the first region and optionally within the second region, wherein the second glass sheet is laminated to the first glass sheet via the intermediate film, and
a radio-wave transmitting material that has higher radio-wave transmissivity than the first region and is disposed in and extending substantially throughout the second region, wherein the radio-wave transmitting material has a thickness smaller than a thickness of the second glass sheet such that the thickness of the second region is smaller than a thickness of the first region.

2. The window member of claim 1, wherein the intermediate film does not extend within the second region.

3. The window member of claim 2, wherein the radio-wave transmitting material itself is adhered to the first glass sheet and the second glass sheet or the radio-wave transmitting material is bonded to the first glass sheet and the second glass sheet via a bonding agent layer.

4. The window member according to claim 1, wherein the intermediate film extends throughout the second region, between the first glass sheet and the radio-wave transmitting material.

5. The window member according to claim 4, wherein the radio-wave transmitting material is bonded to the intermediate film and the second glass sheet via a bonding agent layer.

6. The window member according to claim 1, wherein the second region extends along at least part of a peripheral edge of the second glass sheet inward from a peripheral edge of the first glass sheet in the plan view of the window member.

7. The window member according to claim 1, wherein the second region extends along a hole formed in the second glass sheet adjacent to but not contacting a peripheral edge of the second sheet or a peripheral edge of the first glass sheet in the plan view of the window member.

8. The window member according to claim 7, wherein the hole extends completely through the second glass sheet in the thickness direction of the second glass sheet.

9. The window member according to claim 1, wherein the radio-wave transmitting material is at least one of resin, low-alkaline glass, non-alkaline glass, and silica glass.

10. The window member according to claim 9, wherein the radio-wave transmitting material is resin, wherein the resin is at least one of acrylonitrile-butadiene-styrene (ABS), polyvinyl chloride (PVC), fluorine-based polymer, polycarbonate (PC), cyclo-olefin polymer (COP), syndiotactic polystyrene (s-PS), and modified polyphenylene ether (PPE).

11. The window member according to claim 1, wherein the intermediate film is a polyvinylbutyral or an ethylene vinyl acetal.

12. The window member according to claim 1, wherein a frequency of a radio wave transmitted through the window member is 76 GHz to 81 GHz.

13. A vehicle window glass, comprising the window member according to claim 1.

14. A building window glass, comprising the window member according to claim 1.

15. A window member comprising:
a transparent substrate,
wherein, in a plan view of the window member, the transparent substrate comprises a first region and a second region having a higher radio-wave transmissivity than the first region,
wherein the transparent substrate comprises
a first glass sheet extending throughout the first region and the second region,
a second glass sheet extending throughout the first region but does not extend within the second region such that the second glass sheet does not overlap the first glass sheet in the second region,
an intermediate film extending throughout the first region and optionally within the second region, wherein the second glass sheet is laminated to the first glass sheet via the intermediate film, and
a radio-wave transmitting material that has higher radio-wave transmissivity than the first region and is disposed in and extends substantially throughout the second region, wherein the radio-wave transmitting material is at least one of a low-alkaline glass, non-alkaline glass, and silica glass, different from a glass of the first glass sheet and the second glass sheet.

16. The window member according to claim 15, wherein the intermediate film does not extend within the second region.

17. The window member according to claim 16, wherein radio-wave transmitting material itself is adhered to the first glass sheet and the second glass sheet or wherein radio-wave transmitting material includes a bonding agent layer for bonding the radio-wave transmitting material to the first glass sheet and the second glass sheet.

18. The window member of claim 15, wherein the intermediate film extends throughout the second region, between the first glass sheet and the radio-wave transmitting material.

19. The window member according to claim 18, wherein radio-wave transmitting material includes a bonding agent layer for bonding the radio-wave transmitting material to the intermediate film and the second glass sheet.

20. The window member of claim 15, wherein the second region extends along at least part of a peripheral edge of the second glass sheet inward from a peripheral edge of the first glass sheet in the plan view of the window member.

21. The window member of claim 15, wherein the second region extends along a hole formed in the second glass sheet adjacent to but not contacting a peripheral edge of the second sheet or a peripheral edge of the first glass sheet in the plan view of the window member.

22. The window member according to claim 15, wherein a frequency of a radio wave transmitted through the window member is 76 GHz to 81 GHz.

23. A vehicle window glass, comprising the window member according to claim 15.

* * * * *